Oct. 23, 1923.  
C. E. TOWER  
1,471,985  
FLASH LIGHT HOLDER  
Filed May 15, 1922
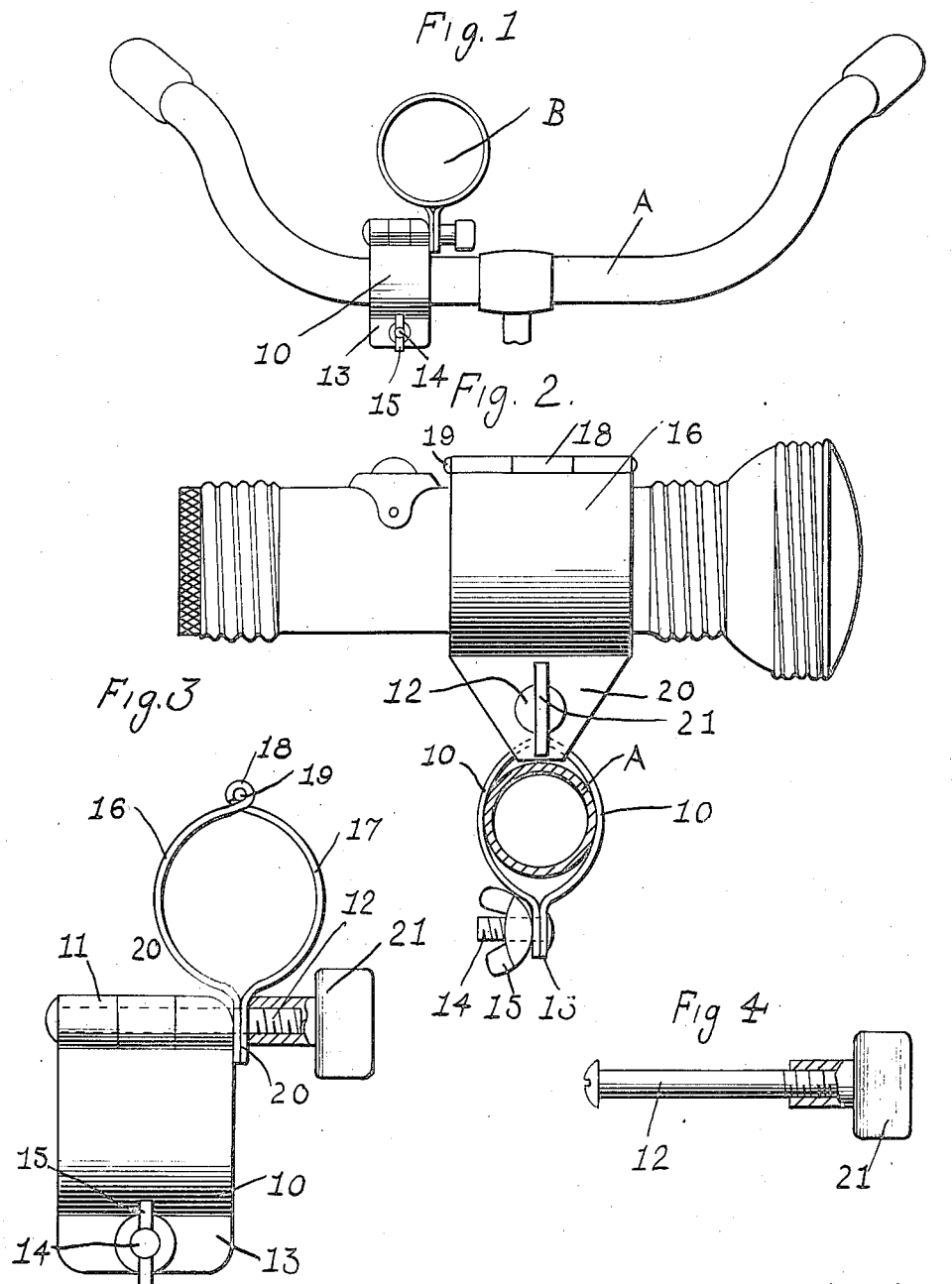
Clarence E. Tower  
INVENTOR  
BY Victor J. Evans  
ATTORNEY Patented Oct. 23, 1923.

1,471,985

UNITED STATES PATENT OFFICE.

CLARENCE E. TOWER, OF NEW HAVEN, CONNECTICUT.

FLASH-LIGHT HOLDER.

Application filed May 15, 1922. Serial No. 560,974.

*To all whom it may concern:*

Be it known that I, CLARENCE E. TOWER, a citizen of the United States, residing at New Haven, in the county of New Haven and State of Connecticut, have invented new and useful Improvements in Flash-Light Holders, of which the following is a specification.

This invention relates to clamping devices, particularly to article supports, and has for its object the provision of a novel device for holding a flash light upon the frame bar of a bicycle or other support, the device being furthermore provided with adjusting means whereby the flash light may be held at any desired angle for the purpose of throwing the light either upwardly or downwardly as may be found most advantageous for use.

An important object is the provision of a device of this character which is capable of engagement upon a support of different sizes and shapes and which is also capable of association with flash lights of different sizes.

An additional object is the provision of a device of this character which will be simple and inexpensive in manufacture, easy to apply, highly efficient in use, durable in service and a general improvement in the art.

With the above and other objects and advantages in view, the invention consists in the details of construction to be hereinafter more fully described and claimed, and illustrated in the accompanying drawings, in which:

Figure 1 is a side elevation of the device in use showing it engaged upon a bar which might be the handle bar of a bicycle.

Figure 2 is an elevation taken at right angles to Figure 1 showing the bar in section.

Figure 3 is an edge view with one element in section and

Figure 4 is a detail view of one of the clamping bolts.

Referring more particularly to the drawings, the letter A designates a support which might be the horizontal bar of a bicycle or which might be some other structure though it is primarily intended that my invention be used for holding a flash light in proper position upon a bicycle frame so that it might be used as a headlight for throwing light upon the roadway during travel. In carrying out my invention I provide a clamping device which includes a pair of metallic strips 10 which have their major portions pressed outwardly as indicated to form mating recesses adapted to engage upon opposite sides of a curved support such as the bar A. At one end these strips 10 are formed with interfitting knuckles 11 through which passes a pintle which in the present instance is indicated as being a thumb screw 12. The other ends of the strip 10 are formed with ears 13 which are formed with holes for the passage of a screw 14 which carries a wing nut 15.

Disposed against one side of the above described clamp is a similar clamp which includes strips 16 and 17 which are formed at one edge with interfitting knuckles 18 pivotally connected by a pintle pin 19, and which are formed at their other ends with ears 20 through which passes the thumb screw 12 which is associated with the first mentioned clamping device. A suitable thumb nut 21 is engaged upon the threaded end of this screw 12 for holding the parts firmly in the desired position.

In the use of the device the nut 21 is removed and the strip 17 is swung upon its pivot 19 so as to permit the engagement of the flash light B between the strips 16 and 17, after which the nut 21 is replaced. The nut 15 is then removed and the strip 11 is swung away from the strip 10 to permit the engagement of this clamp upon the support A after which the nut 15 is replaced in position to effect the necessary clamping action for holding the device in position. By slightly loosening the nut 21 it will be apparent that the clamp associated with the flash light may be swung so as to project the rays of the flash light either up or down as may be desired and the desired adjustment is maintained by subsequently tightening the nut 21.

From the foregoing description and a study of the drawings it will be apparent that I have thus provided a very simply constructed and consequently inexpensive clamping device by means of which a flash light of the cylindrical type may be conveniently supported with respect to a bar of a bicycle frame or other vehicle. It is apparent that the device is adapted for many uses and for holding a flash light in many places where the light may be desired. Owing to the particular formation of the two clamping devices it will be apparent that the one may be engaged upon a supporting bar or rod varying greatly in diameter and that the flash light holding clamp may be engaged upon flash lights of widely varying sizes. Owing to the simplicity of the construction and the fewness of the parts it will be apparent that there is nothing to get out of order and that the device should consequenly have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention, I claim:

A device of the character described comprising a clamp designed for engagement upon a support and including a pair of curve mating strips formed at one end with interfitting knuckels and having their other ends formed with apertured ears, a clamping screw passing through said ears and carrying a clamping nut, a bolt passing through said knuckles, a second clamp designed for engagement about an article to be held and including a pair of strips hingedly connected at one end and having their other ends formed with apertured ears engaged upon the threaded end of said bolt, and a nut screwed onto said bolt and having an elongated shank portion engaging against the outermost ear of the second named clamp, said second named clamp being pivotally mounted for swinging movement at one side of the first named clamp.

In testimony whereof I affix my signature.

CLARENCE E. TOWER.